US012689127B2

(12) United States Patent
Reitmaier et al.

(10) Patent No.: US 12,689,127 B2
(45) Date of Patent: Jul. 21, 2026

(54) COMPONENT CARRIER WITH PROTRUDING DIELECTRIC SIGNAL ELEMENT AND MANUFACTURE METHOD

(71) Applicant: AT&S Austria Technologie & Systemtechnik AG, Leoben (AT)

(72) Inventors: Bernhard Reitmaier, Pölstal Möderbrugg (AT); Ahmad Bader Alothman Alterkawi, Graz (AT); Sebastian Sattler, Graz (AT)

(73) Assignee: AT&S Austria Technologie & Systemtechnik Aktiengesellschaft, Leoben (AT)

( * ) Notice: Subject to any disclaimer, the term of this patent is extended or adjusted under 35 U.S.C. 154(b) by 0 days.

(21) Appl. No.: 18/693,665

(22) PCT Filed: May 16, 2023

(86) PCT No.: PCT/EP2023/063160
§ 371 (c)(1),
(2) Date: Mar. 20, 2024

(87) PCT Pub. No.: WO2023/222716
PCT Pub. Date: Nov. 23, 2023

(65) Prior Publication Data
US 2025/0087891 A1 Mar. 13, 2025

(30) Foreign Application Priority Data
May 19, 2022 (EP) .................................... 22174360

(51) Int. Cl.
*H01Q 9/04* (2006.01)
*H01Q 21/06* (2006.01)

(52) U.S. Cl.
CPC ......... *H01Q 9/0485* (2013.01); *H01Q 21/061* (2013.01)

(58) Field of Classification Search
CPC ........................... H01Q 9/0485; H01Q 21/061
See application file for complete search history.

(56) References Cited

U.S. PATENT DOCUMENTS

2008/0042903 A1* 2/2008 Cheng .................... H01Q 9/065 343/700 MS
2012/0055013 A1 3/2012 Finn
(Continued)

FOREIGN PATENT DOCUMENTS

CN 113410631 A * 9/2021 ............... H01Q 1/48
CN 114374085 A * 4/2022 ............... H01Q 1/38
(Continued)

OTHER PUBLICATIONS

Keyrouz, S; Extended European Search Report in Application No. 22174360.2; pp. 1-10; Nov. 9, 2022; European Patent Office, 80298, Munich Germany.

*Primary Examiner* — Seokjin Kim
(74) *Attorney, Agent, or Firm* — Robert A. Blaha; Smith Tempel Blaha LLC

(57) ABSTRACT

A component carrier-includes i) a stack with at least one electrically insulating layer structure and/or at least one electrically conductive layer structure; ii) at least one signal element, wherein the signal element protrudes from the outermost layer structure of the stack; and iii) a surrounding material arranged on the outermost layer structure of the stack and at least partially surrounding the at least one signal element. The signal element includes a dielectric material with a permittivity that is different than a permittivity of a medium that directly surrounds the at least one signal element.

15 Claims, 1 Drawing Sheet

(56) References Cited

U.S. PATENT DOCUMENTS

| | | | | |
|---|---|---|---|---|
| 2016/0111769 | A1 | 4/2016 | Pance et al. | |
| 2017/0125910 | A1 | 5/2017 | Pance et al. | |
| 2018/0358691 | A1 | 12/2018 | Navarro | |
| 2019/0221940 | A1 * | 7/2019 | Pance | H01Q 9/27 |
| 2021/0307173 | A1 * | 9/2021 | Lenhardt | H01P 7/10 |
| 2023/0163483 | A1 * | 5/2023 | Harel | H01Q 21/26<br>343/853 |
| 2023/0223683 | A1 * | 7/2023 | Vockenberger | H01Q 1/526<br>343/872 |

FOREIGN PATENT DOCUMENTS

| | | | | | |
|---|---|---|---|---|---|
| WO | WO-2018130014 | A1 | * | 7/2018 | H01Q 21/00 |
| WO | WO-2023222714 | A1 | * | 11/2023 | H05K 3/4688 |

* cited by examiner

COMPONENT CARRIER WITH PROTRUDING DIELECTRIC SIGNAL ELEMENT AND MANUFACTURE METHOD

CROSS-REFERENCE TO RELATED APPLICATIONS

This application is a national stage application, filed under 35 U.S.C. § 371, of International Patent Application No. PCT/EP2023/063160, filed on May 16, 2023, claiming priority of the European Patent Application No. EP 22174360, filed on May 19, 2022, the disclosures of which are hereby incorporated by reference herein in their entirety.

TECHNICAL FIELD

The disclosure relates to a component carrier, an electronic device comprising the component carrier, and a method of manufacturing the component carrier.

TECHNOLOGICAL BACKGROUND

In the context of growing product functionalities of component carriers equipped with one or more electronic components and increasing miniaturization of such electronic components as well as a rising number of electronic components to be mounted on the component carriers such as printed circuit boards, increasingly more powerful array-like components or packages having several electronic components are being employed, which have a plurality of contacts or connections, with ever smaller spacing between these contacts. Removal of heat generated by such electronic components and the component carrier itself during operation becomes an increasing issue. At the same time, component carriers shall be mechanically robust and electrically and magnetically reliable so as to be operable even under harsh conditions.

In particular, providing a component carrier with electromagnetic functionalities (e.g. antenna or radar functionalities) in a compact (robust) but still flexible manner remains a challenge. For example, externally assembled components (such as an antenna component mounted on a component carrier) suffer from a non-optimal transition of an electromagnetic wave travelling from the component carrier (via a feeding line) to the antenna component. Due to the required landing pads and/or to the long distance of the feeding line to the antenna component, only a weak coupling between antenna component and component carrier is achieved. Furthermore, a surface-mounted component increases the height of the overall system, which may be a major issue especially in the mobile handheld devices industry. Miniaturization not only in x, y direction but also z direction may be considered an important trend in the mobile industry.

Hence, while the size of the component carrier and manufacturing costs should be kept low, signal transmission quality should be improved.

SUMMARY

There may be a need to manufacture a component carrier with an electromagnetic functionality in an efficient and compact (in particular a low height) manner. A component carrier, an electronic device, and a manufacture method are provided.

According to a first aspect of the disclosure, there is described a component carrier, comprising: i) a stack comprising at least one electrically insulating layer structure and/or at least one electrically conductive layer structure; ii) at least one signal element (on the stack), wherein the signal element protrudes from the outermost layer structure (at least one electrically insulating layer structure or at least one electrically conductive layer structure of the stack); and iii) a surrounding material (e.g. arranged as a layer portion) arranged on the outermost layer structure of the stack and at least partially surrounding the at least one signal element (in particular wherein the layer portion and (a plurality of) the signal element(s) form a discontinuous layer structure). The signal element comprises hereby a dielectric material (e.g. configured as a dielectric resonator antenna) and comprises a permittivity that is different, in particular higher, than a permittivity of a medium (e.g. a fluid such as air, or a (dielectric) embedding material) that directly (e.g. there is at least partially a physical contact) surrounds (encircles) the at least one signal element.

According to a further aspect of the disclosure, there is described a method of manufacturing a component carrier, wherein the method comprises: i) forming a stack comprising at least one electrically insulating layer structure and/or at least one electrically conductive layer structure; ii) forming at least one signal element (on the stack), wherein the signal element protrudes from the outermost layer structure of the stack; and iii) forming a surrounding material on the outermost layer structure of the stack, so that it at least partially surrounds the at least one signal element. The signal element comprises hereby a dielectric material (e.g. configured as a dielectric resonator antenna) and comprises a permittivity that is different, in particular higher, than a permittivity of a medium that directly surrounds the at least one signal element.

Overview of Embodiments

In the context of the present document, the term "component carrier" may particularly denote any support structure which is capable of accommodating one or more components thereon and/or therein for providing mechanical support and/or electrical connectivity. In other words, a component carrier may be configured as a mechanical and/or electronic carrier for components. In particular, a component carrier may be one of a printed circuit board, an organic interposer, and an IC (integrated circuit) substrate. A component carrier may also be a hybrid board combining different ones of the above-mentioned types of component carriers.

In an embodiment, the component carrier comprises a (layer) stack of at least one electrically insulating layer structure and at least one electrically conductive layer structure. For example, the component carrier may be a laminate of the mentioned electrically insulating layer structure(s) and electrically conductive layer structure(s), in particular formed by applying mechanical pressure and/or thermal energy. The mentioned stack may provide a plate-shaped component carrier capable of providing a large mounting surface for further components and being nevertheless very thin and compact. The term "layer structure" may particularly denote a continuous layer, a patterned layer, or a plurality of non-consecutive islands within a common plane.

In the context of the present document, the term "signal element" may particularly denote any element that may be configured to interact with a signal in the form of an electromagnetic wave and that comprises dielectric material. Even though the signal element as such may consist of dielectric material, a metal layer and/or a coating may be formed at an outer surface of the signal element. In a preferred embodiment, the signal element may further provide an electromagnetic functionality, for example an antenna, radar functionality, a filter functionality, an RF/HF coupling functionality, a telecommunication functionality, a UWB (ultra-wide band) application. In one example, the dielectric material comprises a polymer and/or a ceramic, e.g. a polymer-ceramic composite. In another example, the signal element comprises a low temperature co-fired ceramic (LTCC). In a preferred embodiment, the dielectric material is a non-layer stack material, i.e. different in its physical/chemical properties from electrically insulating material of the component carrier layer stack. The signal element is not limited in its shape, and may for example be block-shaped, rectangular-shaped, circular-shaped, and/or structured. For example, the signal element may be configured as a dielectric antenna such as a dielectric resonator antenna. In another example, the signal element may be configured as a filter or an RF/HF coupling device. In one example, the signal element may be a completely dielectric element. In another example, the signal element may comprise a (thin) metal structure such as a coating (e.g. a thin copper coating) on at least one surface. The signal element may be arranged in various optional shapes, for example rectangular, circular, trapezoidal, polygonal, pyramidal, frustoconical, star-like, etc.

In the context of the present document, the term "protrusion" may in particular denote that an element sticks out (extends) with respect to the outermost (external) layer structure (in the stacking-direction) of a stack. The signal element may be in direct contact with the at least one electrically insulating layer structure or the at least one electrically conductive layer structure (that is the outermost layer) and may extend away from said outermost layer structure in the stacking direction (vertical direction along a vector z). Hereby, the signal element and the outermost layer structure may be arranged perpendicular to each other. In an example, the protruding single element may be laminated to the outermost layer structure of the stack.

In the context of the present document, the term "surrounding material" may particularly denote any material that may be arranged on the outermost layer structure of the stack. In particular, the surrounding material may be arranged as a (discontinuous) layer structure. Such a layer structure may be placed on the outermost layer structure of the stack and may partially or fully encircle the signal element(s). Additionally and/or alternatively, the surrounding material may have the same or a higher extension or a lower extension in stack thickness (z) direction as/than the signal element. In an example, the surrounding material may be a layer structure that comprises a recess (cavity) in which the signal element is arranged. In another example, the surrounding material layer structure and the signal element may be of the same material or even originate from the same layer structure preform. In these cases, the surrounding material may be termed a layer portion, since it may resemble a portion of a (discontinuous) layer structure (the signal element(s) being a further portion of said discontinuous layer). The surrounding material/layer portion may be laminated to the outermost layer structure of the stack.

In the context of the present document, the term "medium" may in particular refer to any matter, i.e. a substance that has a mass and takes up space by having a volume, that may directly surround (i.e. with a physical contact) the signal element. The term matter excludes a vacuum or energy. Thus, the medium may be a solid matter or a fluid. In an example, the medium may be an embedding medium, e.g. a resin, that encapsulates at least part of the signal element. In another example, the medium may be a gas such as air. In case that there may be a plurality of signal elements, the space between these signal elements may be at least partially filed with the medium. In an example, the signal element(s) may be arranged in a fluid-filled cavity.

According to an exemplary embodiment, the disclosure may be based on the idea that a component carrier with an electromagnetic functionality may be manufactured in an efficient and compact (in particular a low height) manner, when at least one dielectric signal element with a high permittivity (i.e. higher than the permittivity of the surrounding medium) is formed as a protrusion on the outermost layer structure of the stack, and is protected by a surrounding material. The surrounding material may hereby reflect a manufacturing step of forming the signal element and the surrounding material out of the same layer structure preform.

This architecture may allow an electromagnetic coupling between the signal element and the stack (in particular a transmission structure of the stack) over a very short distance, thereby improving the signal quality. No external components would be necessary and the height of the component carrier is (essentially) not increased. In other words, a (plurality of) signal element(s) is formed surrounded by a layer portion, thereby resembling actually a discontinous layer of the stack. The signal element may be well protected in this manner, while high signal quality may be acheiveable.

Further, the described component carrier may be manufactured using established component carrier manufacturing technology and may thus be directly implemented into existing production lines.

According to an embodiment, the surrounding material is formed as a layer portion arranged laterally to the at least one signal element, so that a space (in particular at least partially filled with the medium) between the at least one signal element and the layer portion is provided.

According to a further embodiment, the layer portion is arranged to provide a cavity delimited by sidewalls formed by the layer portion, wherein the at least one signal element is arranged in the cavity, and wherein the cavity is at least partially filled with the medium.

The signal element may thus be efficiently protected by the surrounding layer portion, in particular within the cavity. Such a cavity may be filled by a fluid or by an embedding material (e.g. a dielectric resin) that encapsulates at least partially the signal element in the cavity. In a specific example, the layer portion and the signal element(s) have been manufactured from the same layer structure preform (e.g. providing the signal element in the cavity by drilling) and may thus form together a discontinuous layer structure.

In this context, the term "laterally" may in particular refer to the circumstance that the signal element and the surrounding material are formed on the same (height) of the outermost stack layer and that the surrounding material (in form of the layer portion) is arranged next to the signal element in a horizontal direction (along the x, y-plane). In other words, a sidewall of the signal element may be arranged in parallel with a sidewall of the layer portion.

According to a further embodiment, the at least one sidewall of the layer portion comprises a metal layer and/or a shielding layer structure. This may provide the advantage that an efficient shielding against electromagnetic radiation (in particular with respect to the signal element and eventually the transmission structure) can be provided in a cost-efficient and robust manner.

In the context of the present document, the term "shielding (layer) structure" may refer to a structure which is configured for shielding electromagnetic radiation from propagating between two different entities, for example a dielectric element and another portion of the component carrier such as an (embedded) electronic component. Hence, the electromagnetic radiation shielding structure may prevent undesired crosstalk of electromagnetic radiation between the dielectric element on the one hand, and at least one component (which may for instance be embedded in the component carrier) and/or an electronic environment of the component carrier and/or another dielectric element of the component carrier on the other hand. The shielding structure is preferably made of an electrically conductive material, e.g. a metal, in particular copper and/or a metal-based surface finish. The shielding structure can also be made of a magnetic conductive material. Using the electrically conductive material and/or the vias, an electrically conductive shielding "cage" may be established around the signal element.

According to a further embodiment, the height/thickness of at least a portion of the layer portion corresponds to the height/thickness (height, along the vertical direction (z)) of the at least one signal element, in particular a plurality of signal elements, more in particular a (planar) array of signal elements. This structural feature may reflect a manufacturing step of forming the signal element(s) and the layer portion out of the same layer structure preform. In another example, the signal element(s) and the layer portion may be manufactured in different processes, but still comprise an at least partially comparable (in particular similar) height. In a further example, the layer portion and the signal element(s) comprise different heights. In an example, the signal element (s) and the layer structure comprise the same material, while in another example the materials may be different.

According to a further embodiment, the at least one signal element and the stack are electromagnetically coupleable/coupled.

In the context of the present document, the term "electromagnetic coupling" may particularly denote a coupling that includes the transmission of electromagnetic waves. For example, two antennas may be considered as electromagnetically coupled, when electromagnetic waves (e.g. radio waves) are exchanged between them (i.e. one antenna serves as a transmitter and the other as a receiver of electromagnetic waves). In another example, one antenna may be configured as a dielectric antenna that is connected to a metal strip (and/or a ground plane) serving as a transmission (feeding) line. When the antenna sends or receives electromagnetic waves, these are coupled into the metal strip via an electrically conductive connection. In case that there may be no electrically conductive connection between a signal element and a transmission structure/line, the electromagnetic coupling (the transfer of electromagnetic waves) may be established by a capacitive coupling (in specific applications an inductive coupling may also be possible) between the signal element and e.g. an electrically conductive (layer) structure (serving as a transmission line).

According to a further embodiment, the electromagnetic coupling is directly through an electrically conductive material, e.g. a metal layer/coating or a metal trace.

According to a further embodiment, the electromagnetic coupling is via an electrically insulating (connection) material that is free of electrically conductive material. In particular, wherein when the electrically insulating material through which the electromagnetic waves are transmitted has a lower permittivity than that of the at least one signal element.

According to a further embodiment, the electromagnetic coupling comprises a transmission of an electromagnetic wave (in particular by capacitive coupling and/or inductive coupling). This may provide the advantage that the transmission of electromagnetic waves from the dielectric element to the layer stack (or the other way around) can be established in a reliable and robust manner without the necessity of an electrically conductive connection.

Capacitive coupling (proximity wave coupling) may be described as the transfer of energy within an electrical network or between distant networks by means of displacement current between circuit(s) nodes, induced by the electric field. This coupling can have an intentional or accidental effect, whereby, in the present case, the capacitive coupling would be an intentional effect.

For a capacitive coupled component, the coupling strength may be drastically improved, as it is directly dependent on the distance between the feeding structure and input of the component.

According to a further embodiment, the component carrier further comprises a transmission (layer) structure, in particular a transmission line.

According to a further embodiment, the transmission structure is arranged below, in particular directly below, the at least one signal element, so that the at least one signal element and the transmission structure are electromagnetically coupleable (e.g. by capacitive/inductive coupling). In particular with an electrically insulating material in between. This may provide the advantage that a robust electromagnetic coupling can be established.

In an embodiment, the transmission structure may be arranged below the dielectric element (so that no electric connection is established). For example, the transmission structure is arranged at the bottom of the cavity. In another example, an electrically insulating layer structure of the layer stack is arranged between the transmission structure and the signal element. In yet another example, the transmission structure is arranged adjacent to the signal element, e.g. positioned horizontally at the sidewall of the cavity.

The term "directly below" may refer in this context to the circumstance that between the transmission line and the at least one signal element an intermediate layer (preferably of dielectric material) is provided or that the transmission line directly (physically) contacts the at least one transmission element.

According to a further embodiment, at least one electrically conductive layer structure of the layer stack is configured as a transmission (feeding) line/structure for the dielectric element. This may provide the advantage that an electrically conductive layer structure may be directly applied as a feeding line and hence, resources can be saved. Further, a flexible transmission line application may be realized.

According to a further embodiment, the component carrier comprises a plurality of the signal elements in the form of an array, in particular a planar array. The plurality of signal elements may be coupleable to a common transmission structure or to respective transmission structures. By providing a plurality of signal elements, preferably as an array, specific signal transmission properties may be achieved. In particular, quality of the signal transmission may be improved in comparison to using only one signal element. In one example, the plurality of signal elements comprises (essentially) the same height and/or volume. In another example, at least some signal elements differ in their height/volume.

According to a further embodiment, the medium (in the cavity) comprises a fluid, in particular a gas, more in particular air.

According to a further embodiment, the medium comprises an embedding material configured to encapsulate the at least one signal element. Accordingly, embedded signal elements may be efficiently protected, in particular so that the signal transmission quality is not hampered.

According to a further embodiment, the medium at least partially fills a space between the at least one signal element and the layer portion and/or between the plurality of signal elements.

According to a further embodiment, the permittivity of the at least one signal element, given as the dielectric constant Dk, is in the range 1 to 100, in particular in the range 1.5 to 15, more in particular in the range 4 to 20 (or a dielectric constant of 4 (in particular 4.5) or larger). In other words, the dielectric signal element comprises a high permittivity, thereby eventually improving its signal transmission properties.

According to a further embodiment, the permittivity of the medium, given as the dielectric constant Dk, is in the range 1 to 5 (i.e. lower than the permittivity of the signal element).

According to a further embodiment, the permittivity of the at least one signal element corresponds to the permittivity of the surrounding material.

According to a further embodiment, an operation frequency is in the range of 0.3 GHz to 300 GHz, in particular a frequency of 10 GHz or larger, more in particular 20 GHz or larger. This may provide the advantage that an established and robust dielectric antenna can be directly applied as the signal element.

According to a further embodiment, the at least one signal element is configured as at least one of the group that consists of: a dielectric resonator antenna (DRA), a filter, an RF/HF coupling device. In particular with an operation frequency in the range of 0.3 GHz to 300 GHz (in particular 1 GHz to 300 GHz). This may provide the advantage that an established and robust dielectric antenna can be directly applied as the dielectric element.

In the context of the present document, the term "dielectric resonator antenna (DRA)" may in particular refer to a dielectric material (e.g. comprising a ceramic) radio antenna that is preferentially used at microwave and millimeter frequencies. According to an example, electromagnetic waves such as radio waves are introduced into the inside of the dielectric material from a transmitter and bounce back and forth between sidewalls of the DRA, thereby forming standing waves. The sidewalls of the DRA may be (at least partially) transparent to electromagnetic waves and thus allow/enable radiation into space.

According to a further embodiment, the at least one signal element comprises at least one material of the group which consists of a polymer, a ceramic, a composite of a polymer and a ceramic, a polymer resin, a thermoplastic material, a curable material, a photoresist, a photo-polymer, a polymer with a filler material, a polymer with a ceramic powder filler material, a polymer with a fiber filler material, and/or a mixture thereof.

According to a further exemplary embodiment, the dielectric element comprises a polymer and/or a ceramic. In particular, a composite of a polymer and a ceramic (for example a polymer matrix with a ceramic filler such as powder, particles, or fibers). This may provide the advantage that an industry relevant material can be directly provided in a cost-efficient manner.

According to a further exemplary embodiment, the polymer comprises at least one of the group consisting of: a polymer resin, a thermoplastic material, a curable material, a photoresist, a photopolymer, a polymer with a filler material (in particular a (ceramic) powder material or a fiber material). This may also provide the advantage that an industry relevant material can be directly provided in a cost-efficient manner.

In an embodiment, polymer resins (e.g. polyimide, polyesterstyrene (PSS)), photoresist polymers (e.g. polymethylmethacrylate (PMMA), which is a positive photoresist and SU-8™ which is an epoxy-based negative photoresist) may be applied. In an example, to counterbalance a lower relative permittivity of pure polymer materials, a filler material with a high relative permittivity may be mixed or added to the polymer to create a composite material with enhanced dielectric properties. In particular, ceramic powders may be efficient filler materials, e.g. aluminum oxide, barium titanate oxide, zirconium oxide (further oxides of calcium, magnesium, titanium, bismuth, barium). The composite material may also include other fillers such as fiber materials, carbon nanotubes, CdS nanowires, and active ferroelectric materials.

In a specific example, the dielectric element comprises an ECCOS-TOCK HiK material with a dielectric constant of 10 and a loss tangent of 0.002.

According to a further embodiment, the height (z) of the at least one signal element is larger than the length (x) and/or the width (y). According to another example, the height (z) of the at least one signal element is smaller than the length (x) and/or the width (y). Thereby, depending on the desired properties, a flexible architecture is enabled.

According to a further embodiment, the bottom of the cavity is at least partially covered by a metal, in particular copper, layer. Said metal layer may be the outermost layer structure of the stack or an additional metal layer (e.g. a coating). The metal layer may serve as a transmission structure and/or an electromagnetic wave shielding structure (see above).

According to a further embodiment, the at least one electrically insulating structure comprises a permittivity lower than the permittivity of the at least one signal element (i.e. higher than (resin) stack material).

According to a further embodiment, the at least one signal element is at least partially covered by a coating, in particular a metal coating. Such a coating may improve the signal transmission quality.

According to a further embodiment, the at least one signal element comprises a rectangular, a cylindrical, a pyramidal, a (frusto-)conical, a star-like, and/or a tapered shape. According to a further exemplary embodiment, the dielectric element comprises at least one of the following features: a (essentially) rectangular shape; a (essentially) circular shape; at least one structured surface; a stack of several dielectric layers; at least one (cylindrical) hole in at least one surface; at least one protrusion; a central part with a plurality of protrusions. This may provide the advantage that a specific structure/shape can be flexibly adapted to a desired application.

According to a further aspect of the disclosure, there is described an electronic device, comprising: i) the component carrier as described above; and ii) at least one functionality of the group which consists of: a 4G functionality, a 5G functionality, a 6G functionality, a microwave functionality (e.g. a microwave component that comprises at least one of filter, antenna, diplexer, coupler), a mm-wave guide functionality, a WiFi functionality, an antenna functionality, in particular a transmitter and/or receiver functionality, a radar functionality, a filter functionality, an RF/HF coupling functionality.

The described component carrier may be integrated into the electronic device or may be arranged separately from the electronic device.

In the context of the present document, the term "antenna" may particularly denote an element connected for instance through a transmission line to a receiver or transmitter. Hence, an antenna may be denoted as an electrical member which converts electric power into radio waves, and/or vice versa. An antenna may be used with a controller (for instance a control chip) such as a radio transmitter and/or radio receiver. In transmission, a radio transmitter may supply an electric current oscillating at radio frequency (i.e. a high frequency alternating current) to the antenna, and the antenna may radiate the energy from the current as electromagnetic waves (in particular radio waves). In a reception mode, an antenna may intercept some of the power of an electromagnetic wave in order to provide a small voltage, that may be applied for example to a receiver to be amplified. In embodiments, the antenna may be configured as a receiver antenna, a transmitter antenna, or as a transceiver (i.e. transmitter and receiver) antenna. In an embodiment, the antenna structure may be used for a radar application. In one example, the antenna may be configured as a single antenna. In another example, the antenna may be configured as an (adhered, embedded) antenna array.

In the context of the present document, the term "4G and/or 5G functionality" may refer to known wireless system standards. 4G (or LTE) is an established standard, while 5G is an upcoming technology which is standardized and may be fully established in the near future. The electronic device may also be suitable for future developments such as 6G. The electronic device may furthermore comply with WiFi standards such as 2.4 GHz, 5 GHz, and 60 GHz. An electronic device may for example comprise a so-called wireless combo (integrated with WiFi, Bluetooth, GPS . . . ), a radio frequency front end (RFFE), or a low power wide area (LPWA) network module. The electronic device may for example be a laptop, a notebook, a smartphone, a portable WiFi dongle, a smart home appliance, or a machine2machine network.

Furthermore, the electronic device may be used for a radar application, e.g. in an industrial field (industry radar) or in the automotive field. Hereby, the antenna structure and/or the dielectric element may be configured for a radar application. In the context of the present document, the term "radar" may refer to an object-detection that uses electromagnetic waves to determine the range, angle, or velocity of one or more objects. A radar arrangement may comprise a transmitter transmitting electromagnetic waves (e.g. in the radio or microwave range). The electromagnetic waves from the transmitter reflect off the object and return to a receiver. Hereby, one antenna structure may be used for transmitting and receiving. Furthermore, a processor such as an electronic component may be used to determine properties of the object such as location and speed based on the received electromagnetic waves.

According to a further embodiment of the method, forming the at least one signal element further comprises: forming (in particular laminating) a layer portion preform on the outermost layer structure of the stack, and removing a part of the layer portion preform to thereby expose the at least one signal element (in particular an array of signal elements). This may provide the advantage that both the signal element and the surrounding material can be formed out of the same preform, thereby reducing effort. In particular in case that an array is formed, the manufacturing process may be especially efficient.

According to a further embodiment of the method, removing a part of the layer portion preform further comprises exposing a layer portion that is arranged laterally, in particular at least partially surrounds, to the at least one signal element. In particular, the thickness of at least a portion of the layer portion corresponds to the thickness of the at least one signal element.

According to a further embodiment of the method, removing comprises at least one of laser drilling, mechanical drilling, photolithography, X-ray lithography, milling, routing, 2.5D manufacturing, mSAP. This may provide the advantage that established component carrier manufacturing methods may be directly applied, thereby saving costs and/or enabling a straightforward implementation.

According to a further embodiment of the method, removing comprises i) providing a (negative image) patterned metal (copper) structure using e.g. a modified semi-additive process (mSAP), ii) laminating dielectric material (layer portion preform) on the patterned metal structure, and iii) removing (e.g. etching) the metal (structure), so that at least one signal element (the dielectric pillar(s)) remains.

According to a further exemplary embodiment, the signal element is (at least partially) formed (directly) in the cavity by additive manufacturing, in particular 3D-printing. This may provide the advantage that the placing can be done directly during the manufacturing process without the need to use external components. In addition to this, the distance between feeding line and antenna may be decreased, thereby ensuring an improved signal integrity.

According to a further embodiment of the method, forming the stack and forming the at least one signal element is done within the same component carrier manufacturing process. This may provide the advantage that the manufacturing process is especially cost-efficient. The described approach may be directly implemented into existing component carrier product lines. For example, the stack may be formed by a lamination process, and the signal element/surround material (preforms) are also laminated onto the stack (e.g. in a subsequent lamination step). As described above, forming the signal element in the surrounding material may be done by established component carrier processes.

In an embodiment, the stack comprises at least one electrically insulating layer structure and at least one electrically conductive layer structure. For example, the component carrier may be a laminate of the mentioned electrically insulating layer structure(s) and electrically conductive layer structure(s), in particular formed by applying mechanical pressure and/or thermal energy. The mentioned stack may provide a plate-shaped component carrier capable of providing a large mounting surface for further components and being nevertheless very thin and compact.

In an embodiment, the component carrier is shaped as a plate. This contributes to the compact design, wherein the component carrier nevertheless provides a large basis for mounting components thereon. Furthermore, in particular a naked die as example for an embedded electronic component, can be conveniently embedded, thanks to its small thickness, into a thin plate such as a printed circuit board.

In an embodiment, the component carrier is configured as one of the group consisting of a printed circuit board, a substrate (in particular an IC substrate), and an interposer.

In the context of the present application, the term "printed circuit board" (PCB) may particularly denote a plate-shaped component carrier which is formed by laminating several electrically conductive layer structures with several electrically insulating layer structures, for instance by applying pressure and/or by the supply of thermal energy. As preferred materials for PCB technology, the electrically conductive layer structures are made of copper, whereas the electrically insulating layer structures may comprise resin and/or glass fibers, so-called prepreg or FR4 material. The various electrically conductive layer structures may be connected to one another in a desired way by forming holes through the laminate, for instance by laser drilling or mechanical drilling, and by partially or fully filling them with electrically conductive material (in particular copper), thereby forming vias or any other through-hole connections. The filled hole either connects the whole stack, (through-hole connections extending through several layers or the entire stack), or the filled hole connects at least two electrically conductive layers, called via. Similarly, optical interconnections can be formed through individual layers of the stack in order to receive an electro-optical circuit board (EOCB). Apart from one or more components which may be embedded in a printed circuit board, a printed circuit board is usually configured for accommodating one or more components on one or both opposing surfaces of the plate-shaped printed circuit board. They may be connected to the respective main surface by soldering. A dielectric part of a PCB may be composed of resin with reinforcing fibers (such as glass fibers).

In the context of the present application, the term "substrate" may particularly denote a small component carrier. A substrate may be a, in relation to a PCB, comparably small component carrier onto which one or more components may be mounted and that may act as a connection medium between one or more chip(s) and a further PCB. For instance, a substrate may have substantially the same size as a component (in particular an electronic component) to be mounted thereon (for instance in case of a Chip Scale Package (CSP)). In another embodiment, the substrate may be substantially larger than the assigned component (for instance in a flip chip ball grid array, FCBGA, configuration). More specifically, a substrate can be understood as a carrier for electrical connections or electrical networks as well as a component carrier comparable to a printed circuit board (PCB), however with a considerably higher density of laterally and/or vertically arranged connections. Lateral connections are for example conductive paths, whereas vertical connections may be for example drill holes. These lateral and/or vertical connections are arranged within the substrate and can be used to provide electrical, thermal and/or mechanical connections of housed components or unhoused components (such as bare dies), particularly of IC chips, with a printed circuit board or intermediate printed circuit board. Thus, the term "substrate" also includes "IC substrates". A dielectric part of a substrate may be composed of resin with reinforcing particles (such as reinforcing spheres, in particular glass spheres).

The substrate or interposer may comprise or consist of at least a layer of glass, silicon (Si) and/or a photoimageable or dry-etchable organic material like epoxy-based build-up material (such as epoxy-based build-up film) or polymer compounds (which may or may not include photo- and/or thermosensitive molecules) like polyimide or polybenzoxazole.

In an embodiment, the at least one electrically insulating layer structure comprises at least one of the group consisting of a resin or a polymer, such as epoxy resin, cyanate ester resin, benzocyclobutene resin, bismaleimide-triazine resin, polyphenylene derivate (e.g. based on polyphenylenether, PPE), polyimide (PI), polyamide (PA), liquid crystal polymer (LCP), polytetrafluoroethylene (PTFE) and/or a combination thereof. Reinforcing structures such as webs, fibers, spheres, or other kinds of filler particles, for example made of glass (multilayer glass) in order to form a composite, could be used as well. A semi-cured resin in combination with a reinforcing agent, e.g. fibers impregnated with the above-mentioned resins is called prepreg. These prepregs are often named after their properties e.g. FR4 or FR5, which describe their flame-retardant properties. Although prepreg particularly FR4 are usually preferred for rigid PCBs, other materials, in particular epoxy-based build-up materials (such as build-up films) or photoimageable dielectric materials, may be used as well. For high-frequency applications, high-frequency materials such as polytetrafluoroethylene, liquid crystal polymer and/or cyanate ester resins, may be preferred. Besides these polymers, low temperature cofired ceramics (LTCC) or other low, very low or ultra-low DK materials may be applied in the component carrier as electrically insulating structures.

In an embodiment, the at least one electrically conductive layer structure comprises at least one of the group consisting of copper, aluminum, nickel, silver, gold, palladium, tungsten, magnesium, carbon, (in particular doped) silicon, titanium, and platinum. Although copper is usually preferred, other materials or coated versions thereof are possible as well, in particular materials coated with supra-conductive material or conductive polymers, such as graphene or poly (3,4-ethylenedioxythiophene) (PEDOT), respectively.

At least one further component may be embedded in and/or surface mounted on the stack. The component and/or the at least one further component can be selected from a group consisting of an electrically non-conductive inlay, an electrically conductive inlay (such as a metal inlay, preferably comprising copper or aluminum), a heat transfer unit (for example a heat pipe), a light guiding element (for example an optical waveguide or a light conductor connection), an electronic component, or combinations thereof. An inlay can be for instance a metal block, with or without an insulating material coating (IMS-inlay), which could be either embedded or surface mounted for the purpose of facilitating heat dissipation. Suitable materials are defined according to their thermal conductivity, which should be at least 2 W/mK. Such materials are often based, but not limited to metals, metal-oxides and/or ceramics as for instance copper, aluminum oxide ($Al_2O_3$) or aluminum nitride (AlN). In order to increase the heat exchange capacity, other geometries with increased surface area are frequently used as well. Furthermore, a component can be an active electronic component (having at least one p-n-junction implemented), a passive electronic component such as a resistor, an inductance, or capacitor, an electronic chip, a storage device (for instance a DRAM or another data memory), a filter, an integrated circuit (such as field-programmable gate array (FPGA), programmable array logic (PAL), generic array logic (GAL) and complex programmable logic devices (CPLDs)), a signal processing component, a power management component (such as a field-effect transistor (FET), metal-oxide-semiconductor field-effect transistor (MOSFET), complementary metal-oxide-semiconductor (CMOS), junction field-effect transistor (JFET), or insulated-gate field-effect transistor (IGFET), all based on semiconductor materials such as silicon carbide (SiC), gallium arsenide (GaAs), gallium nitride (GaN), gallium oxide ($Ga_2O_3$), indium gallium arsenide (InGaAs), indium phosphide (InP) and/or any other suitable inorganic compound), an optoelectronic interface element, a light emitting diode, a photocoupler, a voltage converter (for example a DC/DC converter or an AC/DC converter), a cryptographic component, a transmitter and/or receiver, an electromechanical transducer, a sensor, an actuator, a microelectromechanical system (MEMS), a microprocessor, a capacitor, a resistor, an inductance, a battery, a switch, a camera, an antenna, a logic chip, and an energy harvesting unit. However, other components may be embedded in the component carrier. For example, a magnetic element can be used as a component. Such a magnetic element may be a permanent magnetic element (such as a ferromagnetic element, an antiferromagnetic element, a multiferroic element or a ferrimagnetic element, for instance a ferrite core) or may be a paramagnetic element. However, the component may also be an IC substrate, an interposer, or a further component carrier, for example in a board-in-board configuration. The component may be surface mounted on the component carrier and/or may be embedded in an interior thereof. Moreover, other components, in particular those which generate and emit electromagnetic radiation and/or are sensitive with regard to electromagnetic radiation propagating from an environment, may be used as a component.

In an embodiment, the component carrier is a laminate-type component carrier. In such an embodiment, the component carrier is a compound of multiple layer structures which are stacked and connected together by applying a pressing force and/or heat.

After processing interior layer structures of the component carrier, it is possible to cover (in particular by lamination) one or both opposing main surfaces of the processed layer structures symmetrically or asymmetrically with one or more further electrically insulating layer structures and/or electrically conductive layer structures. In other words, a build-up may be continued until a desired number of layers is obtained.

After having completed formation of a stack of electrically insulating layer structures and electrically conductive layer structures, it is possible to proceed with a surface treatment of the obtained layers structures or component carrier.

In particular, an electrically insulating solder resist may be applied to one or both opposing main surfaces of the layer stack or component carrier in terms of a surface treatment. For instance, it is possible to form such a solder resist on an entire main surface and to subsequently pattern the layer of solder resist to expose one or more electrically conductive surface portions which shall be used for electrically coupling the component carrier to an electronic periphery. The surface portions of the component carrier remaining covered with solder resist may be efficiently protected against oxidation or corrosion, in particular surface portions containing copper.

It is also possible to apply a surface finish selectively to exposed electrically conductive surface portions of the component carrier in terms of a surface treatment. Such a surface finish may be an electrically conductive cover material on exposed electrically conductive layer structures (such as pads, conductive tracks, etc., in particular comprising or consisting of copper) on a surface of a component carrier. If such exposed electrically conductive layer structures are left unprotected, then the exposed electrically conductive component carrier material (in particular copper) might oxidize, making the component carrier less reliable. A surface finish may then be formed for instance as an interface between a surface mounted component and the component carrier. The surface finish has the function to protect the exposed electrically conductive layer structures (in particular copper circuitry) and enable a joining process with one or more components, for instance by soldering. Examples of appropriate materials for a surface finish are Organic Solderability Preservative (OSP), Electroless Nickel Immersion Gold (ENIG), Electroless Nickel Immersion Palladium Immersion Gold (ENIPIG), Electroless Nickel Electroless Palladium Immersion Gold (ENEPIG), gold (in particular hard gold), chemical tin (chemical and electroplated), nickel-gold, nickel-palladium, etc. Also nickel-free materials for a surface finish may be used, in particular for high-speed applications. Examples are ISIG (Immersion Silver Immersion Gold), and EPAG (Electroless Palladium Autocatalytic Gold).

BRIEF DESCRIPTION OF THE DRAWINGS

The aspects defined above and further aspects of the disclosure are apparent from the examples of embodiment to be described hereinafter and are explained with reference to these examples of embodiment.

DETAILED DESCRIPTION OF ILLUSTRATED EMBODIMENTS

Figure 1:
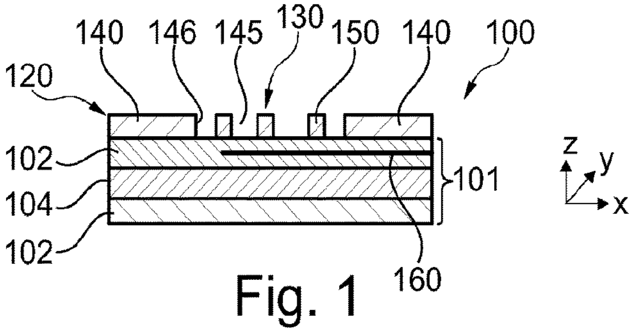
FIG. 1 illustrates a side view of a component carrier according to an exemplary embodiment of the disclosure.

The illustrations in the drawings are schematically presented. In different drawings, similar or identical elements are provided with the same reference signs.

Before referring to the drawings, exemplary embodiments will be described in further detail, some basic considerations will be summarized based on which exemplary embodiments of the disclosure have been developed.

According to an exemplary embodiment, a DRA is directly integrated as a dielectric layer in the PCB. A suitable dielectric material (core) is used and undesired material is removed (e.g. milling, laser, 2.5D) to form the resonating structures. It is described forming a high performing antenna, utilizing e.g. laser cutting, and therefore not increasing the overall height of the PCB. This offers the possibility to easily change from typical patch antennas to DRA by replacing the RF core needed for patch antennas with DRA suitable material. DRAs are formed without the need for external/additional assembly processes. Height requirements are similar to those in patch antennas but antenna arrays can provide a higher performance. This can be a high-performance alternative to microstrip patch antennas and can compete against them in terms of cost.

FIG. 1 illustrates a side view of a component carrier 100 according to an exemplary embodiment of the disclosure. The component carrier 100 comprises a laminated stack 101 with a plurality of electrically insulating layer structures 102 and electrically conductive layer structures 104. In this example, the outermost layer structure of the stack 101 is an electrically insulating layer structure 102. A plurality of signal elements 150 protrude from said outermost layer structure 102 of the stack 101 and are arranged in the form of a planar array 130.

A surrounding material 140 is arranged on the outermost layer structure 102 of the stack 101 and surrounds the plurality of signal elements 150. The signal elements 150 are dielectric elements and respectively comprise a permittivity that is higher than a permittivity of the directly surrounding medium (in this example air) and of the electrically insulating layer structures 102. In this example, the signal elements 150 are configured as dielectric resonator antennas and form an antenna array 130. The surrounding material 140 is arranged as a layer portion 140 laterally to the signal elements 150, so that a cavity 145 is formed, which is delimited by sidewalls 146 formed by the layer portion 140. The signal elements 150 are arranged in said cavity 145. Space between the signal elements 150 and between the layer portion 140 is filled with the medium. The layer portion 140 and the signal elements 150 comprise (essentially) the same height (along z) and form together a discontinuous layer structure 120. Preferably, the signal elements 150 and the layer portion 140 have been manufactured from one and the same original layer structure (see FIG. 4 below).

A transmission structure in the form of a transmission line 160 is embedded in the stack 101, so that the signal elements 150 and the stack 101 are electromagnetically coupleable. The transmission line 160 is arranged below the signal elements 150, thereby enabling an electromagnetic coupling by a transmission of an electromagnetic wave, e.g. by capacitive coupling. Thereby, the distance between transmission line 160 and signal elements 150 is kept very short. In another example, the transmission structure 160 can be an electrically conductive layer structure 104 of the stack 101. In this example, the electromagnetic coupling is via an electrically insulating connection material (e.g. the electrically insulating layer structure 102) and is thus free of electrically conductive material.

Figure 2:
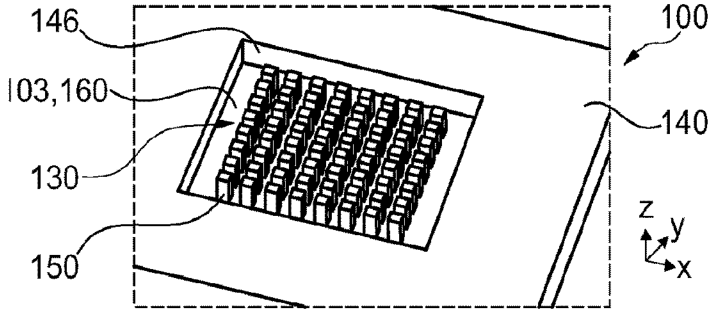
FIG. 2 illustrates a top view of a component carrier according to an exemplary embodiment of the disclosure.

FIG. 2 illustrates a top view on a component carrier 100 according to an exemplary embodiment of the disclosure. The component carrier 100 is similar to the one described for FIG. 1. Yet, the bottom of the cavity 145 is covered by an electrically conductive material 103 (metal cover layer), which can also serve as a transmission structure 160.

Figure 3:
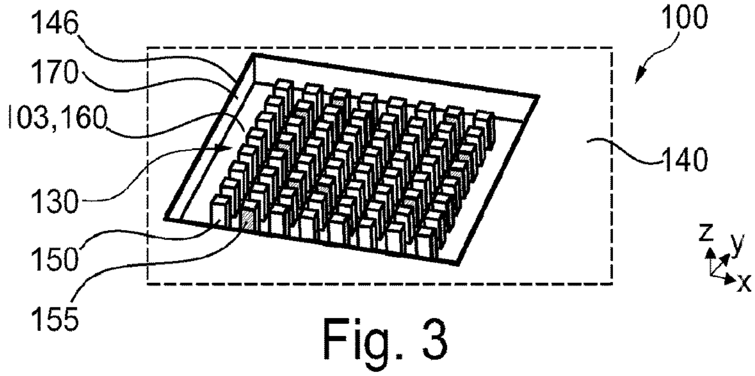
FIG. 3 illustrates a top view of a component carrier according to a further exemplary embodiment of the disclosure.

FIG. 3 illustrates a top view on a component carrier 100 according to a further exemplary embodiment of the disclosure. The component carrier 100 is very similar to the one described for FIG. 2. Yet, the sidewalls 146 of the layer portion 140 are covered by a metal layer structure 170, thereby providing an electromagnetic shielding layer structure. Further, the sidewalls of some of the signal elements 150 are covered with a (metal) coating 155.

FIG. 4 illustrates a method of manufacturing a component carrier 100 according to an exemplary embodiment of the disclosure.

Figures 4A, 4B, 4C:
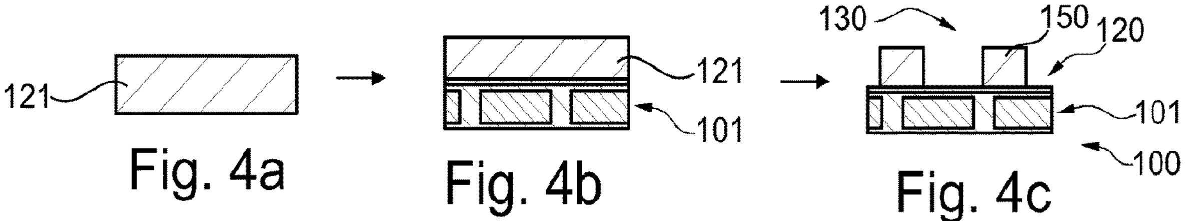
FIG. 4*a*, FIG. 4*b*, and FIG. 4*c* illustrate a method of manufacturing a component carrier according to an exemplary embodiment of the disclosure.

In FIG. 4*a* there is provided a dielectric layer portion preform 121.

In FIG. 4*b* said layer portion preform 121 is arranged on the outermost layer structure 102 of the stack 101.

In FIG. 4*c* a part of the layer portion preform 121 is removed (e.g. by drilling) to thereby expose and provide the plurality of signal elements 150 arranged as an array 130. The material surrounding the plurality of signal elements 150 is the layer portion 140 that surrounds the signal elements 150 in a cavity 145. The thickness of the layer portion 140 corresponds to the thickness of the signal elements 150. Forming the stack 101 and forming the signal elements 150 is done within the same component carrier manufacturing process.

REFERENCE SIGNS

- 100 Component carrier
- 101 Stack
- 102 Electrically insulating layer structure
- 103 Metal cover layer structure
- 104 Electrically conductive layer structure
- 120 Discontinuous layer structure
- 121 Layer portion preform, dielectric layer structure
- 130 Array
- 140 Surrounding material, layer portion
- 145 Cavity
- 146 Sidewall
- 150 Signal element
- 155 Coating
- 160 Transmission line
- 170 Metal layer structure

The invention claimed is:

1. A component carrier, comprising:

a stack comprising at least one electrically insulating layer structure and/or at least one electrically conductive layer structure;

at least one signal element, wherein the signal element protrudes from the outermost layer structure of the stack; and a surrounding material arranged on the outermost layer structure of the stack and at least partially surrounding the at least one signal element;

wherein the at least one signal element comprises a dielectric material and a permittivity that is different than a permittivity of a medium that directly surrounds the at least one signal element, wherein the at least one signal element is laminated onto the stack, and wherein the at least one signal element and the surrounding material have been manufactured from one and the same original layer structure.

2. The component carrier according to claim 1, wherein the surrounding material is formed as a layer portion arranged laterally to the at least one signal element, such that a space between the at least one signal element and the layer portion is provided, wherein the layer portion is arranged to provide a cavity delimited by sidewalls formed by the layer portion, wherein the at least one signal element is arranged in the cavity, and wherein the cavity is at least partially filled with the medium.

3. The component carrier according to claim 2, wherein the at least one sidewall of the layer portion comprises a metal layer structure and/or a shielding layer structure.

4. The component carrier according to claim 2, wherein the height of at least a portion of the layer portion corresponds to the height of the at least one signal element.

5. The component carrier according to claim 1, wherein the at least one signal element and the stack are electromagnetically coupleable;

wherein the electromagnetic coupling is directly through an electrically conductive material; and/or wherein the electromagnetic coupling is via an electrically insulating material that is free of electrically conductive material;

wherein the electromagnetic coupling comprises a transmission of an electromagnetic wave by capacitive coupling and/or inductive coupling.

6. The component carrier according to claim 1, further comprising:

a transmission structure arranged below the at least one signal element, such that the at least one signal element and the transmission structure are electromagnetically coupleable by capacitive coupling and/or inductive coupling.

7. The component carrier according to claim 1, comprising a plurality of the signal elements in an array.

8. The component carrier according to claim 1, wherein the medium comprises a fluid; and/or wherein the medium comprises an embedding material configured to encapsulate the at least one signal element; and/or wherein the medium at least partially fills a space between the at least one signal element and the layer portion and/or between the plurality of signal elements.

9. The component carrier according to claim 1, wherein the permittivity of the at least one signal element, given as the dielectric constant Dk, is in the range 1 to 100; and/or wherein the permittivity of the medium, given as the dielectric constant Dk, is in the range 1 to 5.

10. An electronic device, comprising:

a stack comprising at least one electrically insulating layer structure and/or at least one electrically conductive layer structure;

at least one signal element comprising a dielectric material laminated on the stack, wherein the signal element protrudes from the outermost layer structure of the stack;

a surrounding material arranged on the outermost layer structure of the stack and at least partially surrounding the at least one signal element, wherein the surrounding material has a permittivity that is different than a permittivity of the dielectric material, wherein the at least one signal element and the surrounding material are formed from one and the same original layer structure; and at least one functionality of the group which consists of: a 4G functionality, a 5G functionality, a 6G functionality, a microwave functionality, a mm-wave guide functionality, a WiFi functionality, an antenna functionality, a transmitter and/or receiver functionality, a radar functionality, a filter functionality, an RF/HF coupling functionality.

11. A method of manufacturing a component carrier, the method comprising:

forming a stack comprising at least one electrically insulating layer structure and/or at least one electrically conductive layer structure;

forming at least one signal element on the stack, wherein the signal element protrudes from the outermost layer structure of the stack; and forming a surrounding material on the outermost layer structure of the stack, such that the surrounding material at least partially surrounds the at least one signal element;

wherein the at least one signal element comprises a dielectric material and a permittivity that is different than a permittivity of a medium that directly surrounds the at least one signal element, wherein the at least one signal element is laminated onto the outermost layer structure of the stack, wherein the at least one signal element and the surrounding material at least partially surrounding the at least one signal element are formed from one and the same original layer structure.

12. The method according to claim 11, wherein forming the at least one signal element further comprises:

forming a layer portion preform on the outermost layer structure of the stack; and removing a part of the layer portion preform to thereby expose the at least one signal element.

13. The method according to claim 12, wherein removing the part of the layer portion preform further comprises:

exposing a layer portion that is arranged laterally to, at least partially surround, the at least one signal element, wherein the height of at least a portion of the layer portion corresponds to the height of the at least one signal element.

14. The method according to claim 12, wherein removing comprises at least one of laser drilling, mechanical drilling, photolithography, X-ray lithography, milling, routing, 2.5D manufacturing.

15. The method according to claim 12, wherein forming the stack and forming the at least one signal element is done within the same component carrier manufacturing process.

* * * * *